Feb. 6, 1962 J. A. HUGHES 3,019,474
FISH SKINNING SAW
Filed Nov. 25, 1959
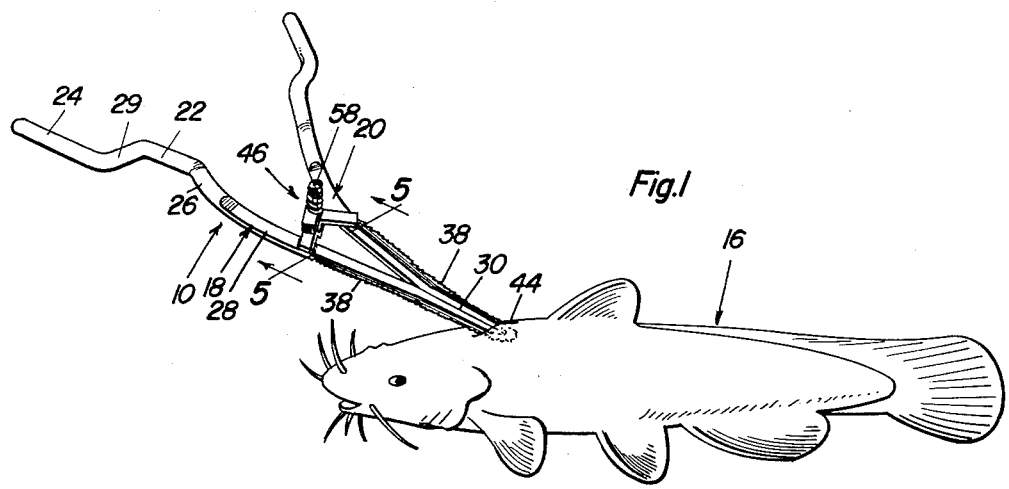
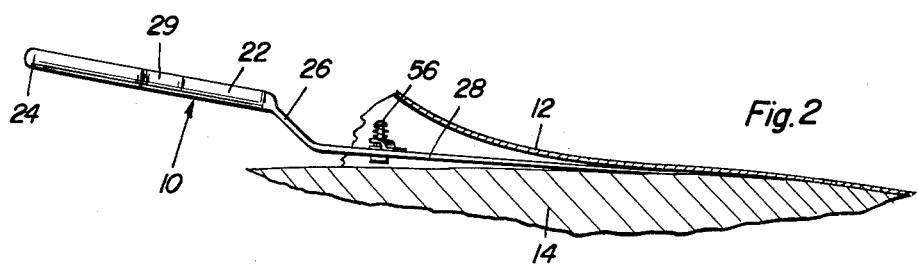
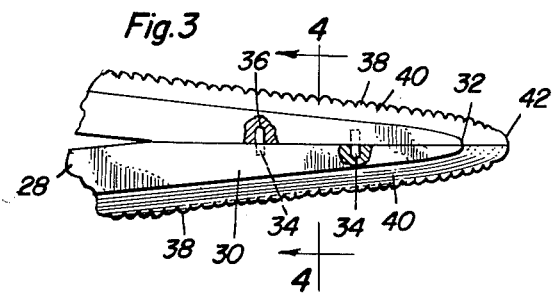
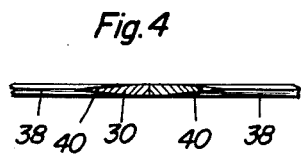
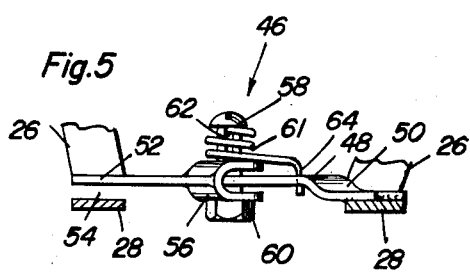
John A. Hughes
INVENTOR.
BY Clarence A. O'Brien
and Harvey B. Jacobson
Attorneys

United States Patent Office 3,019,474
Patented Feb. 6, 1962

3,019,474
FISH SKINNING SAW
John A. Hughes, Box 147, Davis, Okla.
Filed Nov. 25, 1959, Ser. No. 855,337
1 Claim. (Cl. 17—7)

The present invention generally relates to a hand tool for skinning fish and more particularly to an arrangement which acts somewhat in the nature of a saw and somewhat in the nature of a serrated knife for the purpose of removing the skin from a fish.

In certain areas and in connection with certain types of fish, it is desirable to completely remove the skin from the fish. This is especially true of relatively large fish having tough inedible skin such as large cat fish. Accordingly, it is the primary object of the present invention to provide a hand operated saw-like tool including a pair of pivotal elements for use in completely removing the skin from a fish.

Another object of the present invention is to provide a fish skinning saw having novel structural features including saw-like teeth on the outer edges of a pair of pivotal members which face slightly away from the rounded and sharpened end portions of the members together with a novel offset handle arrangement enabling proper manipulation of the device.

Yet another feature of the present invention is to provide a fish skinning saw which is simple in construction, easy to use, efficient for removing skin from a fish, long lasting and generally inexpensive to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a perspective view illustrating the fish skinning saw of the present invention and its relationship to a fish when initially starting the fish skinning operation;

FIGURE 2 is a side elevational view on an enlarged scale of the fish skinning saw illustrating the manner in which it removes the skin from the fish;

FIGURE 3 is an enlarged plan view of the tip end portion of the pivotal elements with portions broken away illustrating alignment pins for retaining the pivotal elements in alignment;

FIGURE 4 is a transverse, vertical sectional view taken substantially upon a plane passing along section line 4—4 of FIGURE 3 illustrating further structural details of the tips of the pivotal elements or blades; and FIGURE 5 is a transverse, vertical sectional view on an enlarged scale taken substantially upon a plane passing along section line 5—5 of FIGURE 1 illustrating the details of construction of the pivotal connection between the pivotal elements.

Referring now specifically to the drawings, the numeral 10 generally designates the fish skinning saw of the present invention which is used for removing the skin 12 from the flesh 14 of a fish generally designated by the numeral 16. The fish skinning saw 10 includes a pair of similar pivotal elements generally designated by the numerals 18 and 20 respectively.

Each of the pivotal members 18 and 20 includes a handle 22 having a free end portion that is flared outwardly slightly as indicated by the numeral 24 whereby the handles 22 when gripped by the hand will be retained easily within the hand during longitudinal movement of the saw by virtue of the outwardly flared terminal end portions 24. The forward end of the handle 22 is provided with a downwardly offset portion 26 terminating in a flattened intermediate portion 28. A horizontally offset portion 29 is disposed between the outwardly flared ends 24 and the downwardly offset portion 26 for providing additional gripping area for the device. The flattened intermediate portions 28 are disposed in converging relation and form blades 30 at the outer ends of the intermediate portions 28. The blades 30 have the inner edges disposed in parallel abutting relationship when in edge-to-edge relation.

The tip ends of the blades 30 are rounded as indicated by the numeral 32 and each of the blades 30 is provided with a pin 34 projecting inwardly therefrom for reception in a socket 36 in the other blade 30. Each of the blades 30 and the corresponding intermediate portion 28 is provided with longitudinally disposed serrations or teeth 38 formed in the outer edge of beveled portion 40 and the teeth 38 are similar to saw teeth and are inclined and pointed in such a manner that they extend towards the handles 22 as illustrated in FIGURE 3. The tip end of the beveled portion 40 on which the saw teeth 38 are formed is rounded and sharpened as designated by the numeral 42 for acting somewhat like a knife blade for insertion into and slitting the skin 12 with the insertion or slit indicated by the numeral 44.

The pivotal elements 18 and 20 are hingedly interconnected by a hinge means generally designated by the numeral 46 which includes a lug 48 secured to the upper surface of one of the intermediate portions 28 and including a slightly upwardly offset portion 50. On the other of the intermediate portions 28, there is a similar lug 52 secured thereto by welding or any other suitable fastening means as designated by the numeral 54 whereby the lugs 48 and 52 will be disposed in horizontal alignment. The lugs 48 and 52 are disposed in acute angular relation to the longitudinal axis of the intermediate portion 28 and incline rearwardly toward the handle 22. The inner end of the lug 52 is provided with a U-shaped extension 56 which receives the terminal end of the lug 48 therebetween. Extending through the legs of the U-shaped member 56 is a pivot pin 58 in the form of a headed fastener which has a retaining nut 60 connected to the lower end thereof with the pin 58 and nut 60 being rigidly attached to the U-shaped extension 56 and the lug 52. An axial coil spring 61 is disposed between the head on the pin 58 and the upper leg of the U-shaped extension 56. One end of the spring 61 is inserted into a slot 62 in the pin 58. This end of the spring is disposed radially inwardly into the slot or notch 62 and the other end of the spring 61 extends outwardly and terminates in a depending portion 64 which engages an edge of the lug 48 which is arranged for urging the blades 30 towards each other or into abutting engagement.

This construction enables the pivotal members 18 and 20 to be pivoted in relation to each other about the axis defined by the pivot pin 58. The spring 61 normally urges the handles 22 away from each other and the blades towards each other. Thus, the rounded tip ends which are sharpened as designated by the numeral 42 may be used somewhat in the nature of a tip end of a knife for slitting and insertion under the skin after which the blades may be partially moved apart by moving the handles 22 towards each other. Note that the relationship of the pivot pin 58 and the converging intermediate portions 28 serve to orientate the blades 30 and the saw teeth 38 generally in parallel relation for a greater angle pivotal movement. That is, the saw teeth 38 are disposed in converging relation when the blades 30 are in contacting relation to each other. Thus, as the blades 30 are moved away from each other, the saw teeth 38 will approach parallelism with each other, then become parallel and then diverge from each other as they move away from parallelism. Thus, for the normal range of the working position of the saw teeth, the saw teeth are substantially parallel thus enabling the teeth to be used more effectively as a saw. When using the device to skin a fish, the sharpened end is inserted under the skin, and by longitudinal movement of the blades somewhat in the nature of a saw, the skin of the fish may be effectively separated from the underlying flesh and of course the handles may be moved towards each other for continuously urging the skin away from the flesh thus combining both a pulling and sawing action when removing the skin.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A fish skinning saw comprising a pair of similar elongated members, means pivotally interconnecting the elongated members intermediate the ends thereof consisting of an inwardly extending lug on each of said members, one of said lugs having a U-shaped extension on the inner end thereof receiving the other lug therebetween, a pivot pin extending through the lugs for pivotally interconnecting the lugs, and spring means mounted on the pin and engaging the lugs in such a manner for urging the blades towards each other, a handle formed on one end of each of the elongated members, and a blade formed on the other end of each of the elongated members, each of said blades being substantially straight and rectangular in cross section and tapering gradually toward the end remote from said handle and having saw teeth on the outer edge thereof, said saw teeth edges being tapered for sawing and severing the skin of a fish and separating the skin from the flesh of a fish.

References Cited in the file of this patent

UNITED STATES PATENTS

| | | |
|---|---|---|
| 2,618,810 | Fishburne | Nov. 25, 1952 |
| 2,647,278 | Weinberger | Aug. 4, 1953 |

FOREIGN PATENTS

| | | |
|---|---|---|
| 416,836 | Great Britain | Sept. 21, 1934 |